(12) United States Patent
Tanaka et al.

(10) Patent No.: US 9,065,098 B2
(45) Date of Patent: Jun. 23, 2015

(54) SECONDARY BATTERY

(75) Inventors: Akira Tanaka, Ibaraki (JP); Murashi Shinto, Saitama (JP); Keiji Hoshino, Saitama (JP); Hiroshi Kamei, Aichi (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 1006 days.

(21) Appl. No.: 13/044,887

(22) Filed: Mar. 10, 2011
(Under 37 CFR 1.47)

(65) Prior Publication Data

US 2011/0311847 A1    Dec. 22, 2011

(30) Foreign Application Priority Data

Mar. 15, 2010    (JP) ................................. 2010-058224

(51) Int. Cl.
| | |
|---|---|
| *H01M 2/12* | (2006.01) |
| *H01M 2/04* | (2006.01) |
| *H01M 10/0525* | (2010.01) |

(52) U.S. Cl.
CPC ............ *H01M 2/043* (2013.01); *H01M 2/1241* (2013.01); *H01M 10/0525* (2013.01); *Y02T 10/7011* (2013.01)

(58) Field of Classification Search
CPC .............. H01M 2/1241; H01M 2/043; H01M 10/0525; Y02T 10/7011
USPC ...................................................... 429/56, 53
See application file for complete search history.

(56) References Cited

U.S. PATENT DOCUMENTS

| | | | |
|---|---|---|---|
| 2,401,448 A | 6/1946 | Woodbridge | |
| 6,432,572 B1 | 8/2002 | Yoshida et al. | |
| 2007/0172722 A1* | 7/2007 | Nishide et al. | ............... 429/53 |

FOREIGN PATENT DOCUMENTS

| | | |
|---|---|---|
| CN | 1713442 A | 12/2005 |
| EP | 1 898 480 A1 | 3/2008 |
| JP | 2000-149901 A | 5/2000 |
| JP | 2000-182591 A | 6/2000 |
| JP | 2000-251949 A | 9/2000 |
| JP | 2002-8616 A | 1/2002 |
| JP | 2002008616 A * | 1/2002 |
| JP | 2002-170595 A | 6/2002 |
| JP | 2002-367583 A | 12/2002 |
| JP | 2003-208882 A | 7/2003 |

(Continued)

OTHER PUBLICATIONS

European Search Report dated Sep. 7, 2011 (four (4) pages).

(Continued)

*Primary Examiner* — Milton I Cano
*Assistant Examiner* — Brent Thomas
(74) *Attorney, Agent, or Firm* — Crowell & Moring LLP

(57) ABSTRACT

A safety valve is disposed to cover at least a portion of the center line of the lid plate between the pair of terminals for the positive electrode and the negative electrode. The distance from the center line of the lid plate to end portions of the components to be energized on the safety valve side is equal to or less than the distance from the center line of the lid plate to the outermost circumference of the safety valve. The shadow area obtained by projecting an opening portion of the safety valve in operation onto the plane of the lid plate does not overlap with the respective shadow areas obtained by projecting the electrically connected components, such as the external output terminals for the positive electrode and the negative electrode, onto the plane of the lid plate.

9 Claims, 6 Drawing Sheets

(56) References Cited

FOREIGN PATENT DOCUMENTS

| JP | 3573295 B2 | 7/2004 |
|---|---|---|
| JP | 2005-190708 A | 7/2005 |
| JP | 2005-317324 A | 11/2005 |
| JP | 2006-216435 A | 8/2006 |
| JP | 2006-324178 A | 11/2006 |
| JP | 4233671 B2 | 12/2008 |
| JP | 2009-289611 A | 12/2009 |
| JP | 2010-40328 A | 2/2010 |
| JP | 2010-97769 A | 4/2010 |

OTHER PUBLICATIONS

Chinese Office Action dated May 6, 2014, including partial English-language summary (ten (10) pages).
Japanese Office Action dated Mar. 25, 2014, including English-language summary (three (3) pages).

* cited by examiner

SECONDARY BATTERY

BACKGROUND OF THE INVENTION

1. Field of the Invention

The present invention relates to a secondary battery having a safety valve.

2. Description of the Related Art

In recent years, in consideration of environmental issues, secondary batteries represented by lithium-ion batteries have been applied not only to mobile objects such as hybrid electric vehicles (HEVs), electric vehicles (EVs), forklifts, and excavators but also to industrial purposes such as uninterruptible power supplies (UPSs) and storages of electric power generated by solar power generation. As the usage of the secondary batteries is spread, it is sought to increase the capacity and the energy density of the secondary batteries.

In addition to increasing the performance of the secondary batteries, increasing the safety of the secondary batteries is also an important issue. Examples of the secondary batteries include nickel-cadmium batteries, nickel-hydrogen batteries, and lithium-ion batteries. Among the currently existing secondary batteries, the lithium-ion secondary batteries are particularly suitable for increasing the energy density, and are currently actively developed.

The nickel-hydrogen batteries and the lithium-ion secondary batteries include, as their main constituent elements, a negative electrode having a negative current collecting member and a negative active material layer held on a surface of the negative current collecting member, a separator holding an electrolyte, and a positive electrode having a positive current collecting member and a positive active material layer held on a surface of the positive current collecting member. The nickel-hydrogen batteries include a nickel oxide in the positive active material layer of the positive electrode and a hydrogen-storing alloy in the negative active material layer of the negative electrode. The lithium-ion secondary batteries include a lithium metal oxide in the positive active material of the positive electrode and a carbon material such as graphite in the negative active material layer of the negative electrode. From the viewpoint of the battery structure, the secondary batteries are roughly classified into those having a cylindrical structure, in which an elongated negative electrode, an elongated separator, and an elongated positive electrode are sequentially layered to make layered structure and the layers are wound into a swirling shape, and those having a layered structure, in which a rectangular negative electrode, a rectangular separator, and a rectangular positive electrode are layered. In general, the layered batteries, in which the rectangular negative electrode, the rectangular separator, and the rectangular positive electrode are layered, are more suitable for increasing the energy density per volume than the batteries having a cylindrical structure, which include a greater volume of space that is not relevant to power generation such as an axial core for winding up the elongated negative electrode, the elongated separator, and the elongated positive electrode. Because the layered batteries require no axial core for wind-up and readily allow a positive output terminal and a negative output terminal to be disposed on an identical surface of a battery case, such batteries can reduce a volume of space including the parts that does not contribute to power generation. The battery case of such secondary batteries includes a case body receiving an electrode group and a lid plate having a positive output terminal member and a negative output terminal member and tightly sealing the case body.

When the conventional secondary batteries are assembled, the output positive terminal member and the output negative terminal member are connected to the electrode group including the negative electrode, the separator, and the positive electrode before the case body is sealed with the lid plate. The positive output terminal member and the negative output terminal member each include a terminal body and a terminal base portion formed at the base of the terminal body. A portion of each output terminal member that is exposed to the outside of the battery case is referred to as the terminal portion, and a portion of each output terminal member that is received inside the battery case is referred to as the terminal base portion. Generally, the terminal base portion of each output terminal member is electrically connected to the electrode group. After an assembly with the lid plate into which the positive output terminal member and the negative output terminal member and the electrode group are assembled is received in the case body, the lid plate is attached to an opening portion of the case body via an insulating member. After the assembly with the lid plate is inserted into the opening portion of the case body, the lid plate and the case body are sealed against each other. In the battery case, the separator, the positive electrode, and the negative electrode, which are constituent elements of the battery assembly, are impregnated with an electrolyte. In order to ensure safety, the battery case is provided with a safety mechanism such as a safety valve. If a rupture, an ignition, or the like occurs in batteries with a high energy density and a large capacity because of wrong use such as overcharging or a short circuit due to mixing of foreign matter, greater damage may be caused compared to the conventional batteries.

Japanese Patent Application Publication No. 2002-8616, for example, discloses a safety valve, which is disposed at a lid plate to which a positive terminal member and a negative terminal member are attached. Japanese Patent No. 3573295 proposes a safety valve disposed on a side surface of a battery case. Japanese Patent No. 3573295 also discloses that a gas discharge hole (safety valve) is disposed at a shadow area obtained by projecting a wound area of a swirling electrode group onto a side wall of a battery case to allow produced gas to be smoothly discharged to the outside of the battery through the gas discharge hole along the winding axis, in order that the produced gas can be smoothly discharged to the outside of the battery case when the safety valve is opened. Japanese Patent No. 4233671 discloses a cylindrical battery in which an electrode column is disposed at the center of a circular sealing plate, a plurality of explosion protection valves are provided at the sealing plate around the electrode column, and a joint surface for a lead is provided on the outer peripheral surface of the electrode column at a circumferential position that is not in the directions in which the plurality of explosion protection valves are disposed so that the plurality of explosion protection valves and the lead are disposed not to overlap with each other as viewed from the direction perpendicular to the sealing plate.

A battery with a large capacity discharges a large amount of gas when ruptured, and thus requires a safety valve with as large an area as possible. If the area of the safety valve is too small for the battery capacity, the amount of gas to be discharged to the outside of the battery case is small for the amount of generated gas. Therefore, the internal pressure of the battery case may not stop rising even if the safety valve is actuated, which may lead to a breakage of the battery case itself. In addition, it is necessary to determine the arrangement of the electrode group including the positive electrode, the negative electrode, and the separator, components to be energized such as terminals, and the safety valve with consideration not to hinder the flow of generated gas inside the battery case to cause a rise in internal pressure. As a breakage occurs at a higher internal pressure, a greater influence is exerted on the surrounding environment by the impact of the breakage or the like. Hence, it is necessary to increase the area of the safety valve and to make the gas flow inside the battery case smoother as the battery capacity becomes larger.

Moreover, in order to suppress a rise in temperature during electrical discharge of a battery with a large capacity, it is necessary to increase the size of the components to be energized such as a positive output terminal member and a negative output terminal member. This is because a battery with a larger capacity discharges a higher current, and therefore produces more heat at the positive output terminal member and the negative output terminal member to reduce the margin between the allowable safe temperature of the battery and the battery temperature unless the electrical resistance of the terminal members is reduced. Thus, the safety valve and the terminal members should be increased in size along with an increase in capacity of the secondary battery.

In order to enhance the energy density, it is necessary to reduce the volume of the battery as much as possible, and to reduce the size of components other than power generating elements, namely, the safety valve and the components to be energized such as the terminal members. Thus, increasing both the capacity and the energy density of a battery involves contradictory requirements for the size of the safety valve and the components to be energized such as the terminal members. In the case of a battery with a large capacity of 100 Ah or more, in particular, the amount of energy stored in the battery is large, and thus it is desired that the battery should be compact and should have as large a safety valve as possible.

In order to enhance the energy density, it is desirable to provide the safety valve and the positive output terminal member and the negative output terminal member on the same surface of the battery case as with the safety valve disclosed in Japanese Patent Application Publication No. 2002-8616. In order to suppress generation of heat due to the energization resistance along with an increase in battery capacity, however, it is necessary to increase the width of the positive output terminal member and the negative output terminal member and tabs formed on the metal current collecting members to which an active material layer is applied and electrically connected to the terminal members. In the secondary battery disclosed in Japanese Patent Application Publication No. 2002-8616, however, no consideration is given to the geometry of the components to be energized such as the output terminal members and the tabs connected to the output terminal members, and no solution is proposed to the issue that generation of heat from the components to be energized such as the terminals and the tabs due to an increase in battery capacity should be suppressed.

Therefore, increasing the size of the safety valve and increasing the width of the output terminal members and the tabs along with an increase in battery capacity may result in the tabs and the output terminal members being extended to a location directly below the safety valve, which may hinder smooth discharge of generated gas during an abnormality.

Meanwhile, if the safety valve is disposed on a side surface of the battery case to allow a smooth flow of gas produced during an abnormality as in the secondary battery disclosed in Japanese Patent No. 3573295, it is necessary to form a hole or the like in a portion of the battery case other than the lid plate on which the positive output terminal member and the negative output terminal member are disposed, which increases the cost. It is also necessary to provide a space for releasing gas or a space for wiring outside a wall surface of the battery case on which the safety valve is disposed and a wall surface of the battery case on which the output terminal members are disposed. In the secondary battery disclosed in Japanese Patent No. 3573295, however, the safety valve and the terminal members for external output are disposed at different wall surfaces of the battery case. Therefore, it is necessary to provide a free space around two wall surfaces of the battery case, which significantly restricts installation of the battery or the like compared to the case where the safety valve and the output terminal members are disposed on the same wall surface.

In the cylindrical battery disclosed in Japanese Patent No. 4233671, when the terminals for external output are disposed at both ends of the battery case, the electrode column serving as the electrode terminal is disposed at the center of each end of the battery case. Therefore, the safety valves may not be disposed at the center of an end portion of the battery case. In addition, the size of each safety valve is limited to a value obtained by subtracting the radius of the electrode column from the radius of the cylindrical battery case or less. Therefore, it is difficult to increase the diameter of the safety valves if the size of the electrode column is increased. Moreover, the output terminals are disposed at both ends of the battery case, which requires a large volume of space for elements other than the power generating elements. Thus, the energy density may not be enhanced compared to the case where the output terminals are provided on an identical wall surface of the battery case. Meanwhile, in the cylindrical battery, gas produced between two adjacent metal current collecting members is discharged along the winding axis. However, the electrode group with a layered structure uses rectangular metal current collecting members, and thus produced gas tends to spread in all directions in the battery case to fill the battery case. Therefore, when the electrode group with a layered structure is used, it is desired to more immediately discharge gas to the outside of the battery case.

Thus, it has been difficult to increase the size of the safety valve in a battery with a large capacity and a high energy density and with a layered structure in which the output terminal members and the safety valve are provided in the lid plate of the battery case.

SUMMARY OF THE INVENTION

An object of the present invention is to provide a secondary battery with a large capacity and a high energy density that excels in safety by reliably discharging gas from the battery when a safety valve is actuated or operated.

A secondary battery according to the present invention comprises an electrode group and a battery case. The electrode group includes one or more negative electrodes each having a negative current collecting member and a negative active material held on the negative current collecting member, one or more positive electrodes each having a positive current collecting member and a positive active material held on the positive current collecting member, and a separator holding an electrolyte. The one or more negative electrodes and the one or more positive electrodes are alternately layered via the separator. The battery case includes a case body having an opening portion and receiving the electrode group and a lid plate closing the opening portion. The secondary battery according to the present invention also includes: a negative output terminal member provided with the lid plate and electrically connected to the one or more negative electrodes; a positive output terminal member provided with the lid plate and electrically connected to the one or more positive electrodes; and a safety valve. The safety valve is provided at the lid plate at a position between the negative output terminal member and the positive output terminal member, and includes an opening area to be opened when the internal pressure of the battery case rises to a predetermined pressure or higher. The safety valve is disposed to partially overlap with an imaginary center line passing through the center between the negative output terminal member and the positive output terminal member and extending along a plate surface of the lid plate to divide the lid plate into two halves. In the present invention, the safety valve, the negative output terminal member, and the positive output terminal member are configured to satisfy the following two conditions. A first condition is that the minimum distance from the imaginary center line to respective end edges of the negative output terminal member and the positive output terminal member on the side of the safety valve is equal to or less than the minimum distance from the imaginary center line to the outermost end edge of the safety valve. A second condition is that a shadow area obtained by projecting the opening area of the safety valve onto an imaginary plane extending along the plate surface of the lid plate does not overlap with respective shadow areas obtained by projecting the negative output terminal member and the positive output terminal member onto the imaginary plane. With this configuration, the shadow area of the opening area of the safety valve does not overlap with the respective shadow areas of the positive output terminal member and the negative output terminal member even if such output terminal members are increased in size. Therefore, a passage for releasing gas from the electrode group to the safety valve is secured to smoothly discharge gas produced during an abnormality to the outside of the battery case. As a result, it is possible to provide a battery structure with a large capacity that ensures enhanced safety.

Preferably, the safety valve is disposed in the lid plate which is located in a direction perpendicular to a layering direction in which the positive electrodes and the negative electrodes in the electrode group are layered. This allows gas produced between the positive current collecting member and the negative current collecting member of the electrode group to pass through a space between the positive current collecting member and the negative current collecting member to be discharged in the direction perpendicular to the layering direction. As a result, it is possible to provide a battery structure that ensures enhanced safety by smoothly discharging gas.

The lid plate may have a rectangular profile, and the safety valve may have a circular profile. In such a case, the safety valve is preferably disposed with its center located at the intersection of the two diagonal lines of the lid plate. An electrical connection tab may be formed at an end portion of the positive current collecting member facing the lid plate. An electrical connection tab may be formed at an end portion of the negative current collecting member facing the lid plate. In such a case, the electrical connection tab of the positive current collecting member and the positive output terminal member may be connected to each other at a position outside the profile of the safety valve. Also, the electrical connection tab of the negative current collecting member and the negative output terminal member may be connected to each other at a position outside the profile of the safety valve. This allows the safety valve to be disposed at the center of the lid plate, which increases the profile of the safety valve. With the tabs and the output terminal members connected to each other at positions which are between the outer periphery of the lid plate and the profile of the safety valve, the positions of connection between the tabs and the output terminal members do not overlap with the safety valve, to secure a passage for discharging gas from the electrode group to the safety valve. As a result, it is possible to provide a battery structure with a large capacity that ensures enhanced safety by smoothly discharging gas produced during an abnormality to the outside of the battery case.

The electrical connection tab of the positive current collecting member and the positive output terminal member may be connected to each other at positions along two imaginary lines, in three imaginary lines dividing the plate surface of the lid plate into four equal quarters in the layering direction of the electrode group, excluding the center imaginary line in the three imaginary lines. The electrical connection tab of the negative current collecting member and the negative output terminal member may also be connected to each other at positions along the two imaginary lines. With this configuration, it is not necessary to make the tabs longer than necessary. The positive output terminal member and the negative output terminal member may be disposed symmetrically to each other with respect to the imaginary center line. In this case, the safety valve may be a circular metal foil provided with a groove pattern formed to open in a surface of the safety valve not facing the electrode group. The safety valve may also be a circular metal foil provided with a groove pattern formed to entirely open the opening area of the safety valve when the safety valve is in operation, in which case the effect of the present invention is enhanced.

Further, the safety valve may be a circular metal foil formed with a groove pattern. The groove pattern may be configured to have a portion passing through the center of the safety valve and an arcuate portion extending along the outer peripheral portion of the safety valve. The groove pattern may have a continuous unicursal design with no intersection. With the groove pattern having a portion passing through the center of the safety valve, it is possible to reduce fluctuations in cracking pressure, at which the safety valve is actuated by the pressure of gas produced during an abnormality. In addition, with the groove pattern having an arcuate portion extending along the outer periphery of the safety valve, it is possible to increase the opening diameter of the safety valve for its circumferential length. Further, with the groove pattern having a continuous unicursal design, it is possible to provide a battery structure with a large capacity and enhanced safety in which a crack in the groove pattern is smoothly propagated and in which fragments of the safety valve are not scattered by the gas discharge pressure. In this case, it is desirable that the groove pattern should have a shape generally corresponding to the shape of an alphabetic letter "s" or "e" or a swirling shape. However, it is apparent that any shape similar to such shapes provides the same effect to a greater or lesser degree.

DESCRIPTION OF THE PREFERRED EMBODIMENTS

Embodiments of the present invention will be described in detail below with reference to the drawings.

First Embodiment

Figure 1:
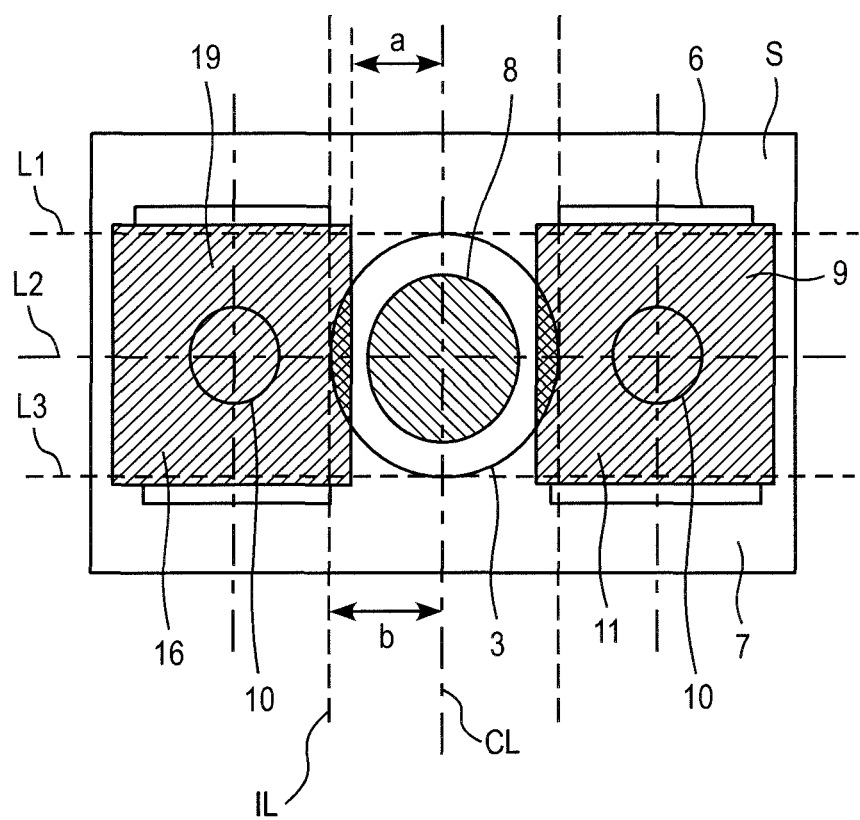
FIG. 1 is a projected plan view of a secondary battery according to an embodiment of the present invention as viewed from the direction of a lid plate.
Figure 2:
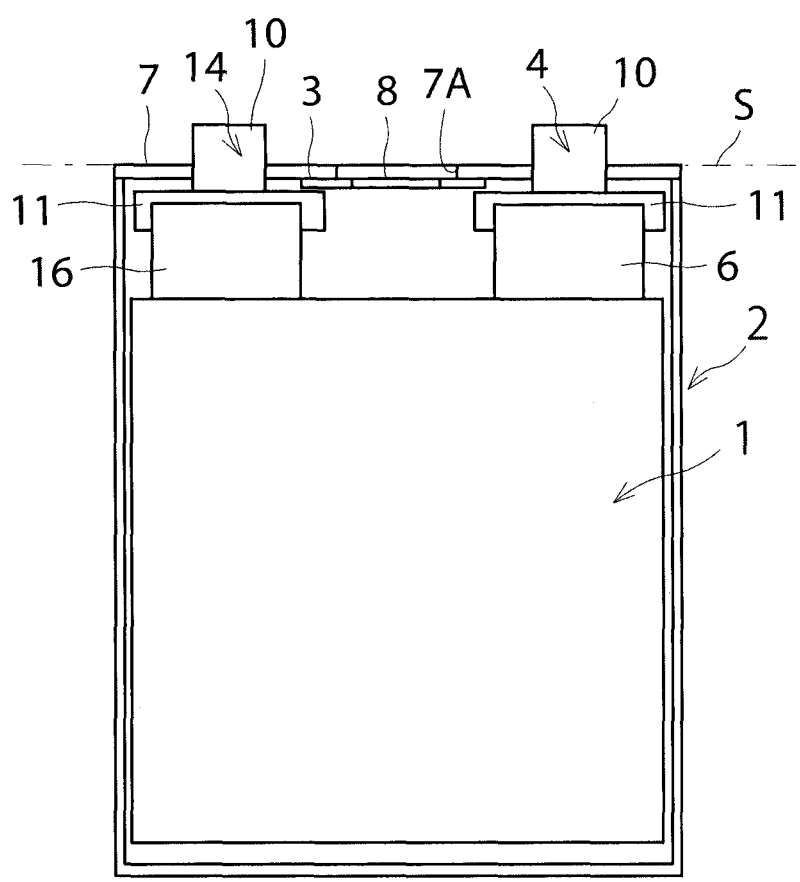
FIG. 2 is a transparent view of the secondary battery according to the embodiment of the present invention as viewed from the direction where a side surface can be seen.

FIG. 1 is a projected view of a battery according to an embodiment of the present invention as viewed from the direction where a lid plate cab be seen. FIG. 2 is a transparent view of the battery of FIG. 1 as viewed from the direction where a side surface can be seen. A layered lithium-ion secondary battery with a battery capacity of 200 Ah is shown.

As shown in FIG. 2, an electrode group 1 includes a negative electrode having a rectangular negative current collecting member (copper) and a negative active material layer held on a surface of the negative current collecting member, a separator holding an electrolyte, and a positive electrode having a rectangular positive current collecting member (aluminum) and a positive active material layer held on a surface of the positive current collecting member. The positive electrode and the negative electrode are alternately layered via the separator. The dimension, such as the width, of the electrode group 1 and the number of positive electrodes and negative electrodes which are layered are determined by the required battery capacity. A battery case 2 has a rectangular parallelepiped shape to receive the electrode group 1 which has a substantially rectangular layered structure. In contrast to cylindrical secondary batteries in which the elongated metal current collecting members and the elongated separator are wound into a cylindrical shape and then inserted into a cylindrical battery case, rectangular layered batteries have a rectangular parallelepiped battery case and do not have an axial core for wind-up or the like, thereby providing an enhanced energy density per volume. Metal materials such as aluminum and stainless steel, for example, are preferred as the material of the battery case 2 in terms of the mechanical strength. However, the material of the battery case 2 is not limited to metal materials, and the battery case 2 may be formed by resins, which are not eroded by the electrolyte, such as fluorine resins, polyethylene, polypropylene, epoxy resins, POM, and PEEK, for example. The battery case 2 made of a resin is light in weight for the low density of the material compared to the battery case 2 made of a metal. However, the battery case 2 made of a resin is weak in strength, and has a low thermal conductivity which leads to low heat radiation.

An electrical connection tab 6 is unitarily formed at an end portion of the positive current collecting member, which is one of the elements constituting the electrode group 1, in the longitudinal direction. An electrical connection tab 16 is unitarily formed at an end portion of the negative current collecting member in the longitudinal direction. The tab 6 and a positive output terminal member 4, and the tab 16 and a negative output terminal member 14, are secured to each other by ultrasonic welding. Electrically connected components including the positive output terminal member 4 and the negative output terminal member 14 refer to parts which comprise secondary electrically connected components. The secondary electrically connected components are, for example, external output terminals for the positive and negative electrodes, tab fusion bonding plates that are joined to the tabs, pressing plates that press the tab fusion bonding plates against the external output terminals, and metal fastening members such as nuts, washers, and bolts. The positive output terminal member 4 and the negative output terminal member 14 each include a terminal portion 10 having a portion exposed from a lid plate 7 to the outside of the battery case 2 and a terminal base portion 11 received inside the battery case 2. The electrode group 1 includes positive electrodes each including the tab 16 and negative electrodes each including the tab 16. The number of positive electrodes and that of negative electrodes are determined by the capacity of the battery. For example, for a battery with a capacity of several tens to several hundreds of Ah, several tens to several hundreds of electrodes (in the total of positive electrodes and negative electrodes) are used. In the drawings showing the embodiment, a plurality of tabs bundled together are conveniently represented as a single element as in the tabs 6, 16 in FIG. 1, for example. When the number of the tabs 6, 16 is large, the electrically connected components including the output terminal member 4, 14 may be constructed the secondary electrically connected components. The tabs 6,16 are joined to the electrically connected components by ultrasonic welding in groups using the secondary components (not shown). The tabs 6 and the positive output terminal member 4, and the tabs 16 and the negative output terminal member 14, may be electrically connected to each other by swaging, crimping, or the like other than the ultrasonic welding. In FIG. 1, the electrode group 1 is not shown to facilitate understanding of the positional relationship between respective shadow areas 9, 19 obtained by projecting the positive output terminal member 4 and the negative output terminal member 14 onto an imaginary plane S including a plate surface of the lid plate 7 and a shadow area 8 obtained by projecting an opening area of a safety valve 3 in operation onto the imaginary plane S.

In FIG. 1, in which the electrode group 1 is not shown, the layering direction corresponds to the direction in which the short sides of the rectangular lid plate 7 extend, or the perpendicular direction in which the plurality of tabs 6 (16) are arranged. The electrical connection tabs 6 of the positive current collecting members and the positive output terminal member 4 are connected to each other at positions along two imaginary lines L1 and L3, in three imaginary lines L1 to L3 dividing the lid plate 7 into four equal quarters in the layering direction of the electrode group 1, excluding the center imaginary line L2 in the three imaginary lines L1 to L3. The electrical connection tabs 16 of the negative current collecting members and the negative output terminal member 14 are also connected to each other at positions along the two imaginary lines L1 and L3. By connecting the plurality of tabs to the output terminal member in groups, the length of the tabs may be shortened to half compared to when all the tabs are connected to the center of the output terminal member (4, 14).

As shown in FIG. 1, the safety valve 3 is disposed to partially overlap with an imaginary center line CL passing through the center between the positive output terminal member 4 and the negative output terminal member 14 and extending along the plate surface of the lid plate 7 to divide the lid plate 7 into two halves. The imaginary center line CL extends to intersect the imaginary line L2, which passes through the center of the positive output terminal member 4 and the center of the negative output terminal member 14, at a right angle at the position where the imaginary line L2 is divided into two halves. The minimum distance from the imaginary center line CL to the outermost circumference or the outermost end edge of the safety valve 3 is defined as "b". The minimum distance from the imaginary center line CL to the end edge of the positive output terminal member 4 or the negative output terminal member 14 on the safety valve 3 side is defined as "a". In the conventional batteries, generally, the minimum distance a from the imaginary center line CL to the end edge of the positive output terminal member 4 or the negative output terminal member 14 on the safety valve 3 side is set to be longer than the distance b from the imaginary center line CL to the outermost end edge (outermost circumference) of the safety valve 3 in order to prevent the safety valve 3 from overlapping with the positive output terminal member 4 or the negative output terminal member 14. With this configuration, however, it is difficult to increase the discharge current according to increased capacity of the battery. This is because the size of the positive output terminal member 4 or the negative output terminal member 14 cannot be increased according to increased battery capacity. In addition, if the shadow area 8 obtained by projecting the opening area of the safety valve 3 onto the imaginary plane S along the plate surface of the lid plate 7 overlaps with the respective shadow areas 19 and 9 obtained by projecting the negative output terminal member 14 and the positive output terminal member 4 onto the imaginary plane S, the discharge of gas generated during an abnormality may be hindered by the negative output terminal member 14 and the positive output terminal member 4 when the gas is discharged from the safety valve 3. When the gas is discharged from the battery case to the outside of the battery case 2 through the safety valve 3, molten pieces of the positive current collecting members or the negative current collecting members, which have been subjected to a high temperature during an abnormality, may clog a space between the negative output terminal member 14 and the positive output terminal member 4, thereby hindering smooth discharge of the gas. In such a case, when the safety valve 3 does not adequately function, the internal pressure of the battery case 2 may rise, which leads to a breakage of the battery case 2 even if the safety valve 3 is opened. According to the embodiment of the invention, the minimum distance a from the imaginary center line CL to the respective end edges of the negative output terminal member 14 and the positive output terminal member 4 on the safety valve 3 side is set to be shorter than the distance b from the imaginary center line CL to the outermost end edge of the safety valve 3. That is, the respective end edges of the negative output terminal member 14 and the positive output terminal member 4 are disposed closer to the imaginary center line CL than the outermost end edge of the safety valve 3. The shadow area of the opening area of the safety valve 3 does not overlap with the respective shadow areas of the positive output terminal member 4 and the negative output terminal member 14 even if the output terminal members are increased in size. Therefore, a sufficient passage for releasing gas from the electrode group 1 to the safety valve 3 is secured. As a result, the safety valve 3 can adequately function to smoothly discharge gas produced during an abnormality to the outside of the battery case 2. In addition, the tabs 6, 16 and the positive output terminal member 4 and the negative output terminal member 14 are connected to each other at positions on the side of the outer periphery of the lid plate 7 with respect to the outermost end edge (outer circumference) of the safety valve 3. This ensures a large area for joint with the tabs 6, 16, which suppresses an increase of an electric resistance due to increased battery capacity.

The lid plate 7 is provided with holes through which the respective terminal portions 10 of the positive output terminal member 4 and the negative output terminal member 14 pass. The positive output terminal member 4 and the negative output terminal member 14 are fixed to the back surface of the lid plate 7 via a seal member (not shown), an electric insulating member (not shown), and a fastening member (not shown). It is a matter of course that the connection between the lid plate 7 and the positive output terminal member 4 and the negative output terminal member 14 is not limited thereto. The lid plate 7, the positive output terminal member 4, and the negative output terminal member 14 may integrally be formed by insert molding. In this case, the positive output terminal member 4 and the negative output terminal member 14 are electrically insulated from the lid plate 7.

The safety valve 3 has a circular profile with its center disposed at the intersection of the two diagonal lines of the rectangular lid plate 7. When the internal pressure of the battery is raised by gas produced in the battery to become higher than the withstanding pressure of the safety valve 3, the opening area of the safety valve 3 is cracked along a groove pattern so that the gas in the battery is released to the outside of the battery case 2 through the safety valve 3. The safety valve 3 is disposed in a direction perpendicular to the layering direction in which the positive electrode and the negative electrode in the electrode group 1 are layered so that the produced gas passes between the positive electrode and the negative electrode and then is smoothly discharged through the safety valve 3. With the center of the circular profile of the safety valve 3 located at the intersection of the two diagonal lines of the lid plate 7, gas is not likely to reside in the battery case 2, even if the battery is inclined, compared to when the safety valve 3 is located near an end portion of the lid plate 7. The profile of the safety valve 3 is not limited to a perfect circle shape, and may be a shape including an arcuate portion such as an oval shape, a rectangular shape with rounded corners, or an egg-like shape. The safety valve 3 is a thin circular plate made of stainless steel and formed with a groove pattern by etching. Upon a predetermined pressure, the safety valve 3 is cracked at a portion of the groove pattern to be opened along the groove pattern. The cracking pressure is adjusted in accordance with the relationship between the outer circumference of the safety valve 3 and the geometry of the groove pattern. The groove pattern will be described in detail later.

The method of forming a groove in the safety valve 3 is not limited to etching, and the groove may be formed by pressurization, laser processing, or cutting. In the embodiment, a through hole 7A, which is larger than the opening area of the safety valve 3, is formed in the lid plate 7 at a position where the safety valve 3 is to be attached. Then, the safety valve 3 is attached to the back surface of the lid plate 7 by laser welding. The structure for providing the safety valve 3 at the lid plate 7 is not limited to the technique employed in the embodiment. For example, the safety valve 3 may be directly mechanically formed at the lid plate 7 by cutting or pressurization. The material of the safety valve 3 is not limited to stainless steel, and may be a metal such as aluminum, nickel or the like or a resin such as a fluorine resin, polyethylene, or polypropylene. Also, the safety valve 3 may be made from a material that is impervious to water and is the same as or is easily joined to the material of the lid plate 7.

When the safety valve 3 is in operation, the distance from the center to the outermost portion of the groove pattern 5 corresponds to the opening diameter of the safety valve 3. The positive output terminal member 4 and the negative output terminal member 14 are disposed symmetrically to each other in the horizontal direction with respect to the imaginary center line CL passing through the center of the lid plate 7. Owing to this configuration, current may equally be distributed to flow from the positive electrode and the negative electrode to the positive output terminal member 4 and the negative output terminal member 14. The shadow area 8 obtained by projecting the opening area of the safety valve 3 in operation onto the imaginary plane S including the plate surface of the lid plate 7 does not overlap with the respective shadow areas 9, 19 obtained by projecting the positive output terminal member 4 and the negative output terminal member 14 onto the imaginary plane S. That is, the shadow area 8 obtained by projecting the opening area of the safety valve 3 in operation onto the imaginary plane S does not overlap with all or any part of the respective shadow areas 9, 19 obtained by projecting the positive output terminal member 4 and the negative output terminal member 14 onto the imaginary plane S. As a result, the gas produced in the battery case 2, primarily in the electrode group 1, may smoothly pass through a space from the electrode group 1 to the opening area of the safety valve 3 attached to the lid plate 7 without being hindered by the positive output terminal member 4 and the negative output terminal member 14. This makes it possible to provide a battery structure that ensures enhanced safety by ensuring reliable gas discharge. A battery according to the present embodiment was prepared and subjected to an overcharge test to measure the internal pressure, the temperature, the battery voltage, and the current. As a result of continuously charging the battery until the safety valve was actuated, the safety valve was opened at a predetermined pressure to discharge gas. Once the safety valve was opened, the safety valve or the electrically connected components were not clogged by any part of the metal current collecting members and abrupt variations in pressure such as bumping was not observed. Then, the internal pressure decreased as the time elapsed. Thus, the secondary battery of the present embodiment was confirmed as being highly safe.

Second Embodiment

Figure 3:
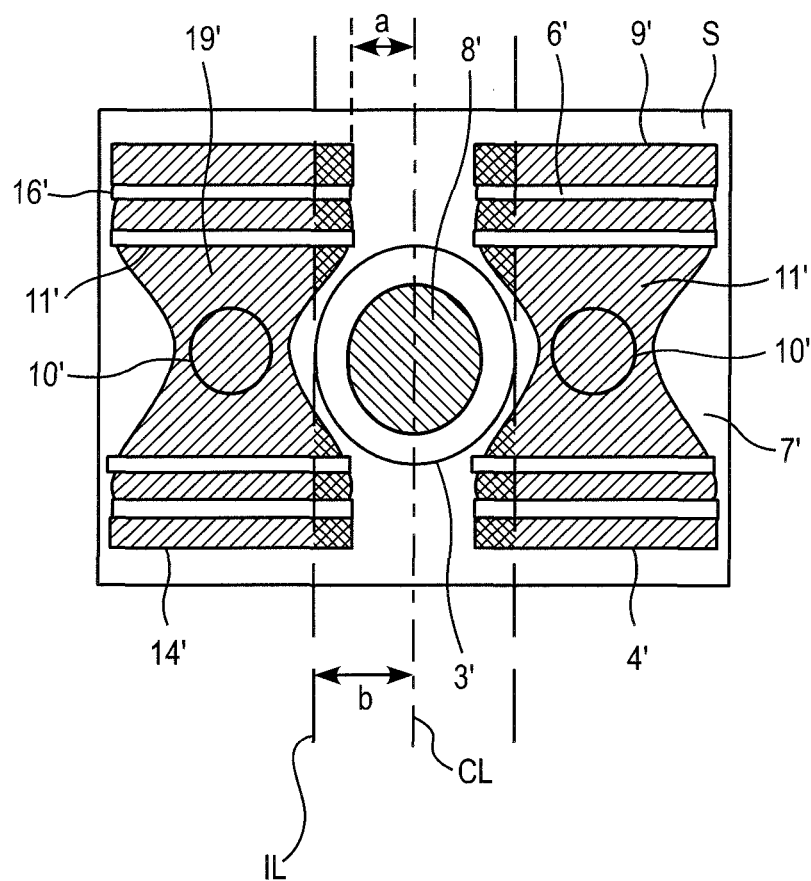
FIG. 3 is a projected plan view of a secondary battery according to another embodiment of the present invention as viewed from the direction where a lid plate can be seen.

FIG. 3 is a projected plan view of a battery according to a second embodiment of the present invention as viewed from above a lid plate 7'. The secondary battery according to the second embodiment is a lithium-ion secondary battery of a layered structure and with a capacity of 250 Ah which is 1.25 times larger than that of the battery according to the first embodiment. The capacity density has been improved by improving the positive and negative active material layers. The dimensions of the lid plate 7' are the same as the lid plate 7 according to the first embodiment. In each of a positive output terminal member 4' and a negative output terminal member 14', a portion of a terminal base portion 11' around a terminal portion 10', which is a terminal for external connection that stands up vertically with respect to the lid plate 7', is dented or curved toward the terminal portion 10'. A shadow area 8' obtained by projecting the opening area of a safety valve 3' in operation onto the imaginary plane S including the plate surface of the lid plate 7' does not overlap with respective shadow areas 9', 19' obtained by projecting the positive output terminal member 4' and the negative output terminal member 14' onto the imaginary plane S. The width of the lid plate 7' is the same as that of the lid plate 7 according to the first embodiment. The distance between the positive output terminal member 4' and the negative output terminal member 14' disposed at the lid plate 7' is the same as that in the battery according to the first embodiment. In the second embodiment, however, the diameter of the safety valve 3' and the diameter of the opening area have been increased. The safety valve 3' is located at the intersection of the two diagonal lines of the lid plate 7'.

In the embodiment, the minimum distance a from the imaginary center line CL of the lid plate 7' to the respective end edges of the positive output terminal member 4' and the negative output terminal member 14' on the safety valve 3' side is set to be shorter than the distance b from the imaginary center line CL to the outermost end edge of the safety valve 3'. That is, the respective end edges of the positive output terminal member 4' and the negative output terminal member 14' are disposed closer to the center of the lid plate 7' than the outermost end edge of the safety valve 3'. This ensures a large area for joint with tabs 6', 16', thereby suppressing an increase of an electric resistance due to increased battery capacity.

The tabs 6', 16', which are portions for electrical connection extending from the electrode group, are respectively joined to the positive output terminal member 4' and the negative output terminal member 14' at positions between the outer periphery of the lid plate 7' and the outer circumference of the safety valve 3'. Since there are many tabs 6', 16', the tabs 6', 16' are respectively joined to the positive electrode and the negative electrode each at four positions.

According to the second embodiment, the tabs 6', 16' and the positive output terminal member 4' and the negative output terminal member 14' are connected to each other at positions between the outer periphery of the lid plate 7' and the outer circumference of the safety valve 3', it is possible to increase the diameter of the safety valve 3'. The safety valve 3' has a circular profile with its center disposed at the intersection of the two diagonal lines of the lid plate 7'. As viewed in a longitudinal direction of the metal current collecting members for the positive and negative electrodes forming the electrode group, the electrical connection tabs 6',16' are formed at end portions of the metal current collecting members. The electrical connection tabs 6',16' and the positive and negative output terminal members 4',14' are respectively connected to each other at positions between the outer periphery of the lid plate 7' and the outer circumference of the safety valve 3'. The shadow areas obtained by projecting the positive output terminal member 4' and the negative output terminal member 14' onto the imaginary plane S and the shadow area obtained by projecting the safety valve 3' onto the imaginary plane S including the plate surface of the lid plate 7' do not overlap with each other. This makes it possible to form the safety valve 3' with a circular profile over a wide area, and to ensure the safety for a battery with an increased capacity.

Figure 4:
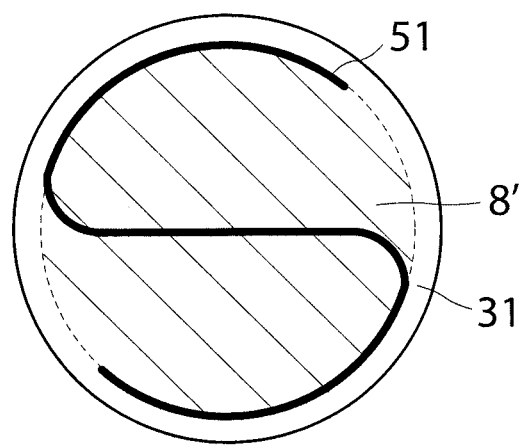
FIG. 4 is a plan view of a safety valve provided in a secondary battery according to an embodiment of the present invention.

FIG. 4 shows an example of the safety valve 3'. FIG. 4 shows a safety valve 31 with a groove pattern 51 generally corresponding to the shape of an alphabetic letter "s". The groove pattern 51 has a straight portion passing through the center of the safety valve 31 and arcuate portions extending along the outer periphery of the safety valve 31, and has a continuous unicursal design. The groove forming the groove pattern 51 is formed to open toward the lid plate 7'. This allows the groove pattern 51 to be cracked to form an opening portion when the safety valve 31 is in operation. That is, the area of the opening portion corresponds to the shadow area 8' obtained by projecting the opening portion of the safety valve 31 in operation onto the plane of the lid plate. The groove pattern 51 does not have a closed shape so that no fragments of the safety valve 31 are scattered when the safety valve 31 is opened. That is, even after the groove in the groove pattern 51 is opened, portions of the safety valve around the opened groove are left as a part of the lid plate 7'

The groove forming the groove pattern can be formed by etching. The safety valve is formed of a stainless steel foil, which is the same as the material of the safety valve according to the first embodiment. Besides stainless steel, a material that is impervious to water and that is the same as or is easily joined to the material of the lid plate may be used as in the first embodiment. In view of the need to instantaneously release energy, the groove pattern is preferably shaped to have a larger diameter when the safety valve is opened at a location closer to the outer periphery of the safety valve. However, as the arcuate portion in the groove pattern is closer to the outer periphery of the safety valve, the safety valve is affected to a greater degree by thermal strain or the like that occurs when the safety valve is attached to the lid plate, which may cause fluctuations in cracking pressure.

In the groove pattern 51 shown in FIG. 4, the straight portion passes through the center of the safety valve 31. Therefore, a crack is initially caused at a portion of the groove in the vicinity of the center of the safety valve 31, and propagated along the groove to the arcuate portions continuously formed along the outer periphery of the safety valve 31, which opens the safety valve 31. This makes it possible to reduce fluctuations in cracking pressure, and to increase the opening diameter. The groove pattern is not limited to that shown in FIG. 4, and may be a pattern having a portion passing through the center of the safety valve and an arcuate portion extending along the outer periphery of the safety valve, such as those shown in FIGS. 5, 6, and 7, for example.

Figure 5:
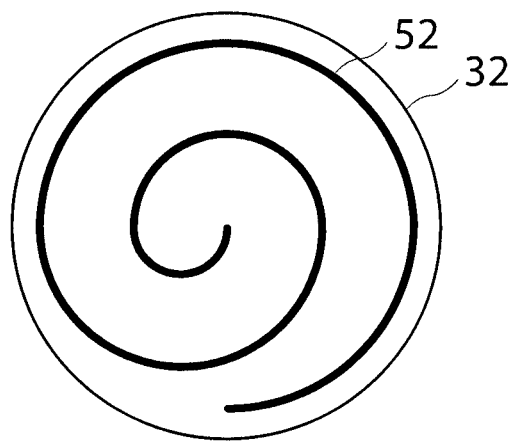
FIG. 5 is a plan view of another safety valve that can be used in a secondary battery according to an embodiment of the present invention.

FIG. 5 shows a safety valve 32 with a swirling groove pattern 52 that starts at the center of the safety valve 32. When the safety valve 32 is in operation, a crack is caused at a portion of the groove in the vicinity of the center of the safety valve 32, and is propagated along the groove to a portion of the groove at the outermost circumference of the safety valve 32, which opens the safety valve 32.

Figure 6:
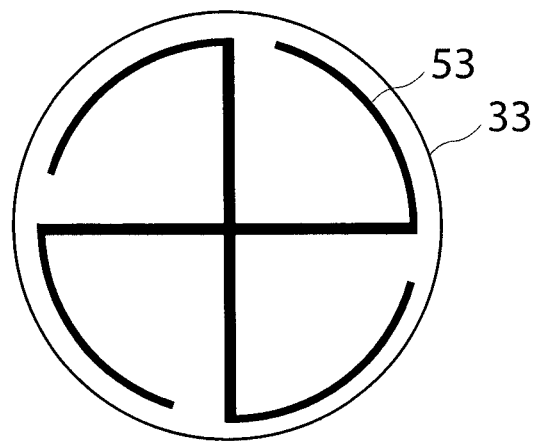
FIG. 6 is a plan view of still another safety valve that can be used in a secondary battery according to an embodiment of the present invention.

FIG. 6 shows a safety valve 33 with a groove pattern 53 having a plus sign portion and arcuate portions provided at the four ends of the plus sign portion. When the safety valve 33 with the groove pattern 53 is in operation, a crack is caused in the vicinity of the intersection of the grooves at the center, and is propagated in four directions, which opens the safety valve 33.

Figure 7:
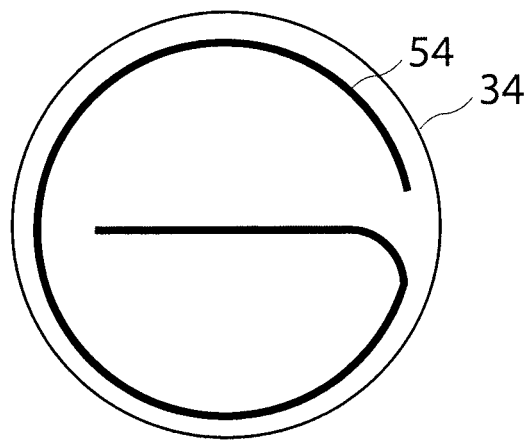
FIG. 7 is a plan view of yet another safety valve that can be used in a secondary battery according to an embodiment of the present invention.

FIG. 7 shows a safety valve 34 with a groove pattern 54 generally corresponding to the shape of an alphabetic letter "e". When the safety valve 34 is in operation, a crack is caused at the straight portion of the groove passing through the center of the safety valve 34, and is propagated to the arcuate portion of the groove continuously formed along the outer periphery of the safety valve 34, which opens the safety valve 34.

The safety valves of FIGS. 4 to 7 provide substantially the same opening diameter when the safety valves are in operation. In particular, the groove patterns of FIGS. 4, 5, and 7 each have a continuous unicursal design with no intersection. Thus, a crack in the groove pattern is propagated in a uniquely determined direction, which causes the safety valve to reliably open. The groove pattern is not specifically limited to a shape of the alphabetic letter "s", a swirling shape, a shape of a plus sign with extended end portions, or a shape of the alphabetic letter "e", and may have an arcuate portion to provide the effect described above.

Thus, with the safety valve formed by a circular metal foil formed with a groove pattern including a portion passing through the center of the safety valve and an arcuate portion extending along the outer periphery of the safety valve and having a continuous unicursal design, it is possible to reduce fluctuations in opening pressure of the safety valve, and to open the safety valve at a predetermined pressure. This makes it possible to provide a battery structure that ensures enhanced safety.

Figure 8:
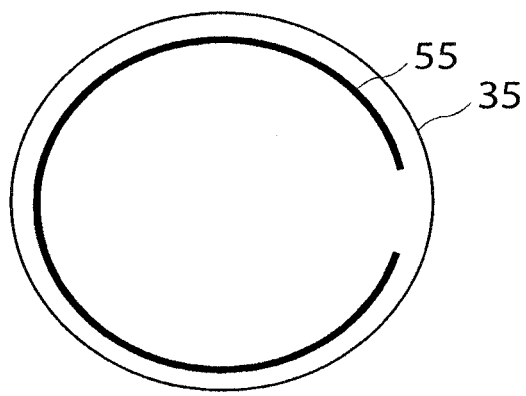
FIG. 8 is a plan view of a safety valve provided in a secondary battery according to the related art.

For comparison with the safety valves of FIGS. 4 to 7, a safety valve 35 with a groove pattern 55 not passing through the center of the safety valve 35 as shown in FIG. 8 was prepared and subjected to a cracking test. Consequently, it was found that fluctuations in cracking pressure of the groove patterns of FIGS. 4 to 7 were smaller than fluctuations in cracking pressure of the groove pattern 55 of FIG. 8.

A secondary battery according to the second embodiment was prepared and subjected to an overcharge test to measure the internal pressure, the temperature, the battery voltage, and the current. The secondary battery was continuously charged until the safety valve was actuated. As a result, the safety valve was opened at a predetermined pressure to discharge gas. Once the safety valve was opened, the safety valve or the electrically connected components were not clogged by any part of the metal current collecting members and abrupt variations in pressure such as bumping was not observed. Then, the internal pressure decreased as the time elapsed. Thus, the secondary battery of the present embodiment was confirmed as being highly safe.

Even if the battery capacity for the same volume of the electrode group is increased by improving the characteristics of the active materials as in the second embodiment, it is possible to increase the area of the safety valve without increasing the dimensions of the battery case, thereby ensuring safety. In addition, if the battery capacity is increased by changing the number of electrodes which are layered using metal current collecting members with the same dimensions, it is possible to increase the area of the safety valve without increasing the width of the battery case, thereby ensuring safety.

While certain features of the invention have been described with reference to example embodiments, the description is not intended to be construed in a limiting sense. Various modifications of the example embodiments, as well as other embodiments of the invention, which are apparent to persons skilled in the art to which the invention pertains, are deemed to lie within the spirit and scope of the invention.

What is claimed is:

1. A secondary battery comprising:
    an electrode group including one or more negative electrodes each having a negative current collecting member and a negative active material held on the negative current collecting member, one or more positive electrodes each having a positive current collecting member and a positive active material held on the positive current collecting member, and a separator holding an electrolyte, the one or more negative electrodes and the one or more positive electrodes being alternately layered via the separator;
    a battery case including a case body having an opening portion and receiving the electrode group and a lid plate closing the opening portion;
    a negative output terminal member provided with the lid plate and electrically connected to the one or more negative electrodes;
    a positive output terminal member provided with the lid plate and electrically connected to the one or more positive electrodes; and
    a safety valve provided at the lid plate at a position between the negative output terminal member and the positive output terminal member and including an opening area to be opened when the internal pressure of the battery case rises to a predetermined pressure or higher, wherein:
    the safety valve is disposed to partially overlap with an imaginary center line passing through the center between the negative output terminal member and the positive output terminal member and extending along a plate surface of the lid plate to divide the lid plate into two halves; and the safety valve, the negative output terminal member, and the positive output terminal member are configured such that the minimum distance from the imaginary center line to respective end edges of the negative output terminal member and the positive output terminal member on the side of the safety valve is equal to or less than the minimum distance from the imaginary center line to the outermost end edge of the safety valve, and such that respective shadow areas obtained by projecting the negative output terminal member and the positive output terminal member onto an imaginary plane extending along the plate surface of the lid plate partially overlap with areas defined between the imaginary center line and an imaginary line extending in parallel to the imaginary center line and passing through the outermost end edge of the safety valve, but a shadow area obtained by projecting the opening area of the safety valve onto the imaginary plane does not overlap with respective shadow areas obtained by projecting the negative output terminal member and the positive output terminal member onto the imaginary plane.

2. The secondary battery according to claim 1, wherein the safety valve is disposed in the lid plate which is located in a direction perpendicular to a layering direction in which the positive electrodes and the negative electrodes in the electrode group are layered.

3. The secondary battery according to claim 1, wherein:
the lid plate has a rectangular profile;
the safety valve has a circular profile with its center located at an intersection of two diagonal lines of the lid plate;
an electrical connection tab is formed at an end portion of the positive current collecting member facing the lid plate;
an electrical connection tab is formed at an end portion of the negative current collecting member facing the lid plate;
the electrical connection tab of the positive current collecting member and the positive output terminal member are connected to each other at a position outside the profile of the safety valve; and
the electrical connection tab of the negative current collecting member and the negative output terminal member are connected to each other at a position outside the profile of the safety valve.

4. The secondary battery according to claim 3, wherein:
the electrical connection tab of the positive current collecting member and the positive output terminal member are connected to each other at positions along two imaginary lines, in three imaginary lines dividing the plate surface of the lid plate into four equal quarters in the layering direction of the electrode group, excluding the center imaginary line in the three imaginary lines; and
the electrical connection tab of the negative current collecting member and the negative output terminal member are connected to each other at positions along the two imaginary lines.

5. The secondary battery according to claim 3, wherein the positive output terminal member and the negative output terminal member are disposed symmetrically to each other with respect to the imaginary center line.

6. The secondary battery according to claim 3, wherein the safety valve is a circular metal foil provided with a groove pattern formed to open in a surface of the safety valve not facing the electrode group.

7. The secondary battery according to claim 3, wherein the safety valve is a circular metal foil provided with a groove pattern formed to entirely open the opening area of the safety valve when the safety valve is in operation.

8. The secondary battery according to claim 1, wherein the safety valve is a circular metal foil formed with a groove pattern having a portion passing through the center of the safety valve and an arcuate portion extending along the outer peripheral portion of the safety valve, the groove pattern having a continuous unicursal design with no intersection.

9. The secondary battery according to claim 8, wherein the groove pattern has a shape generally corresponding to the shape of an alphabetic letter "s", a shape generally corresponding to the shape of an alphabetic letter "e", a swirling shape, or a shape similar to such shapes.

* * * * *